Figure 1:
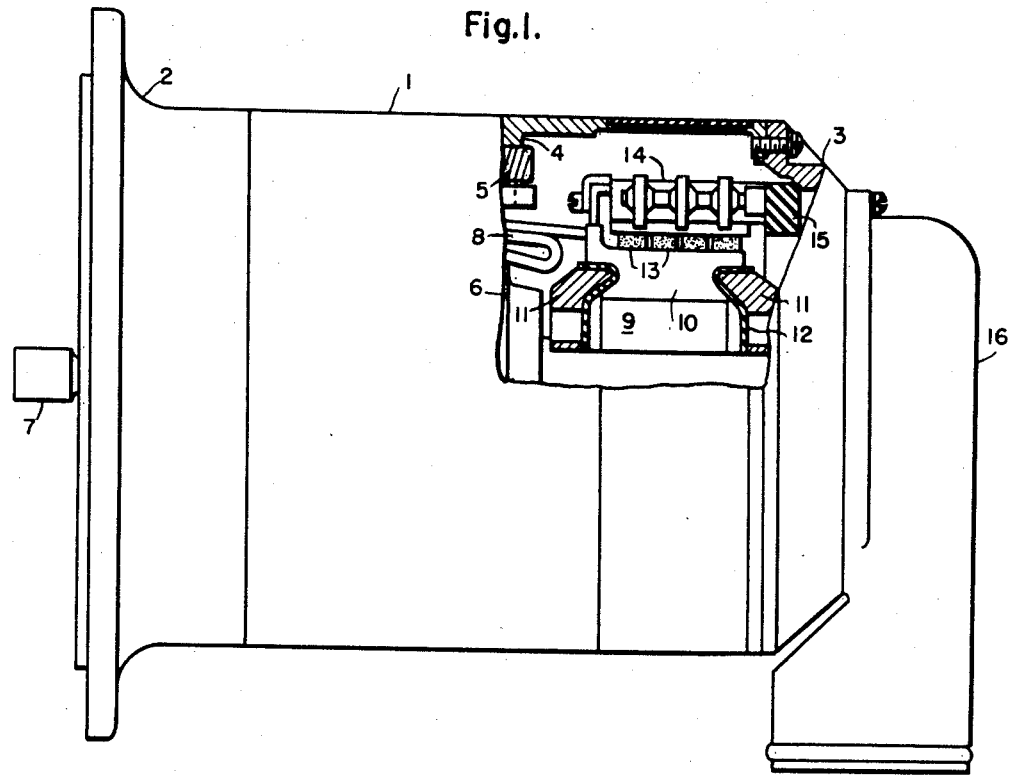

March 20, 1956 — L. E. MOBERLY — 2,739,254
CURRENT COLLECTING MEANS FOR DYNAMOELECTRIC MACHINES
Filed June 30, 1954

WITNESSES:

INVENTOR
Lawrence E. Moberly.
BY
ATTORNEY

United States Patent Office 2,739,254
Patented Mar. 20, 1956

2,739,254

CURRENT COLLECTING MEANS FOR DYNAMO-ELECTRIC MACHINES

Lawrence E. Moberly, Pitcairn, Pa., assignor to Westinghouse Electric Corporation, East Pittsburgh, Pa., a corporation of Pennsylvania Application June 30, 1954, Serial No. 440,449

8 Claims. (Cl. 310—228)

The present invention relates to dynamoelectric machines and, more particularly, to the current collecting means of such machines, including collector rings or commutators and their cooperating brushes.

The rotating current collecting members of dynamoelectric machines have usually been made of substantially pure copper, with carbon brushes engaging the rotating members. When such machines, with copper collector rings or commutators and carbon brushes, have been used at high altitudes, however, as on aircraft, it has been found that the brushes would wear very rapidly, and usually would actually disintegrate into carbon dust at a rapid rate. This dusting of the brushes reduces their life to such a short period that it has been impossible to use ordinary carbon brushes in motors and generators for use on aircraft.

This problem has been overcome, as disclosed and claimed in a patent to H. M. Elsey, No. 2,414,514, by impregnating the brushes with a non-hygroscopic metal halide, such as barium fluoride or lead iodide, and brushes treated in this way have long life at high altitude and have been extensively and successfully used. The required brush treatment, however, is relatively expensive and has the disadvantage of increasing the contact resistance between the brush and the current collector, as well as tending to increase the brush friction. These effects are undesirable because they tend to raise the brush temperature.

It has recently been found that this treatment of the brushes can be eliminated, and that untreated carbon brushes can be used at high altitudes, by making the current collecting members of a copper-nickel alloy, as disclosed and claimed in a copending application of H. M. Elsey, Serial No. 440,438, filed June 30, 1954. The most satisfactory results are obtained by using an alloy having a relatively high nickel content, of the order of 55% to 60% and as the nickel content is reduced, the tendency to dusting of the untreated brushes appears to increase. The high nickel content, however, requires a relatively large amount of nickel, which is an expensive material of limited availability. High nickel content also results in an alloy which has relatively high electrical resistance and which is a hard material considerably more difficult to work than the copper which has been used heretofore.

The principal object of the invention is to provide current collecting means for dynamoelectric machines which prevents dusting or rapid wear of the brushes at high altitude, or under other adverse conditions of operation, and which avoids the disadvantages of the solutions of this problem mentioned above.

Another object of the invention is to provide current collecting means for dynamoelectric machines which comprises collector rings or commutators made of a copper-nickel alloy having relatively low nickel content, in combination with carbon brushes treated with a minimum amount of metal halide. This combination makes it possible to use a low-resistance, easily worked material for the collector member together with relatively inexpensive brushes, and effectively prevents dusting of the brushes even at very high altitudes.

Figure 2:
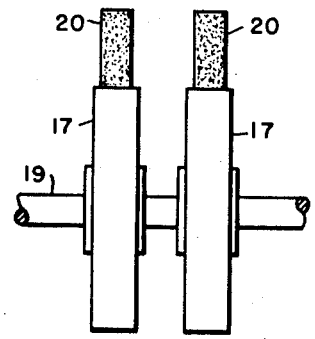

The invention will be more fully understood from the following detailed description, taken in connection with the accompanying drawing, in which:

Figure 1 is a view of a direct current dynamoelectric machine in side elevation, partly broken away; and Fig. 2 is a view of a collector ring assembly.

The invention may be applied to the current collecting means of any type of dynamoelectric machine, or in general to any device in which electrical contact must be made to a rotating member. A direct current generator of the type usually used on air craft is shown in Fig. 1 by way of example. This machine has a frame member 1 with end brackets 2 and 3 of any suitable type at each end. Field poles 4 are supported on the frame 1 and carry field windings 5. The machine has an armature member 6 mounted on a shaft 7 and carrying suitable armature windings 8. The armature winding 8 is connected to a commutator 9 mounted on the shaft 7. The commutator 9 may be of any suitable type and is shown as consisting of a plurality of commutator bars 10 insulated from each other and clamped in a cylindrical assembly by means of V-rings 11, which engage in V-grooves in the bars and are insulated from them by suitable insulation 12. Stationary brushes 13 engage the surface of the commutator and are supported in brush holders 14 of any suitable type mounted on a rocker ring 15 attached to the end bracket 3. An air shield 16 may be mounted on the bracket 3 to direct a blast of cooling air into the machine.

The invention is also applicable to a collector ring assembly such as is shown in Fig. 2. In this figure, there are shown two conducting rings 17 mounted on, and insulated from, a shaft 19 which may, for example, be the shaft of the rotating field member of an alternator, or other rotating member having windings to which electrical connection must be made. Stationary brushes 20 which may be supported in any suitable manner are shown engaging the collector rings 17 to make contact thereto.

As previously indicated, if the commutator bars 10 and the collector rings 17 are made of substantially pure copper and used with untreated carbon brushes, the brushes will rapidly disintegrate into carbon dust when the machine is operated at high altitudes. This conventional construction, therefore, cannot be used in aircraft equipment. The brush treatment which has been used to prevent dusting, consisting of impregnating the brushes with a non-hygroscopic metal halide, effectively prevents dusting, but is relatively expensive, and causes the brush temperature to be undesirably high.

The use of current collecting members of a copper-nickel alloy, as described in the copending application mentioned above, permits the use of untreated brushes, but a relatively high nickel content is required for optimum results, and to prevent dusting at all altitudes, so that the cost is relatively high and the resistance of the alloy is greater than would be desirable.

In accordance with the present invention, the disadvantages of these solutions of the problem of brush dusting are avoided by using an alloy of low nickel content for the collector member, with brushes which have a small amount of treatment which is very much less than has been required heretofore.

The usual practice heretofore has been to impregnate the brushes with from 6% to 8% by weight of barium fluoride, or other suitable metal halide. If the collector member with which the brushes cooperate is made of a copper-nickel alloy containing as little as 15% to 30% nickel, however, dusting of the brushes is prevented under all conditions, if they contain only a small amount of metal halide, preferably from 1% to 3% by weight.

Thus, it has been found that with brushes containing from 1% to 3% barium fluoride cooperating with collector rings of a copper-nickel alloy containing substantially 30% nickel, no dusting of the brushes occurs even at altitudes of 60,000 feet. Smaller amounts of nickel may also be used, and protection against dusting is obtained with brushes containing nickel content as low as 15%, with brushes containing 1% to 3% by weight of barium fluoride, or other suitable metal halide. The best results appear to be obtained with alloys of nickel content in the range from 30% to 45% with brushes having from 1% to 3% treatment. The lower limit of nickel content, however, is of the order of 15% and good brush life is obtained with such alloys even at relatively high altitudes, although the rate of brush wear will be slightly greater than with higher nickel content.

Increasing the amount of metal halide in the brushes tends to increase the brush temperature undesirably, and probably has little effect on the brush life when used with collector members of a copper-nickel alloy, so that the optimum treatment is approximately 1% to 3%, which is much less than half the treatment previously required. Increased nickel content of the alloy above 45% may have some effect in slightly improving the brush life, but when used with the treated brushes described, the brush temperature becomes too high because of the high resistance of the alloy. The range of nickel content indicated above, that is, from 15% to 45%, therefore, is the preferred range of nickel content, with the best results probably being obtained with from 30% to 45% nickel.

The use of the copper-nickel alloy in combination with brushes having a small amount of metal halide treatment has many advantages. Thus, it permits the use of alloys of low nickel content, which is desirable because of the high cost and limited availability of nickel, and the low nickel alloys also have lower electrical resistance and are more easily worked. The brush temperatures are also lower than when treated brushes of the previously known type are used with copper collector members, or where untreated brushes are used with a high nickel alloy.

The combination of treated brushes with a low nickel alloy has the further important advantage that little or no sea level operation is required prior to operation at high altitude. With the treated brushes previously used, on copper collector members, an extended period of ground level operation at full electrical load is required, to form the necessary film on the surface of the collector, before high altitude operation is permissible. With the new current collectors and brushes described herein, however, no ground level operation is needed, and long life at high altitude is obtained. The brush life obtained is greater than previously obtainable with treated brushes and copper collectors, and is better than can be obtained with untreated brushes and high nickel alloy collectors, both at high altitude and at ground level or low altitude.

The advantages of the invention have been described with reference to high altitude operation, but it is also beneficial for many sea level or ground applications as well, and will materially increase the brush life under adverse conditions of operation. The life at sea level is much greater than can be obtained with untreated brushes and high nickel alloys, so that both sea level and high altitude operation are improved.

It will now be apparent that a current collecting means has been provided for dynamoelectric machines which prevents dusting or rapid wear of the brushes under high altitude or other adverse conditions, and which avoids the disadvantages of other solutions of this problem. The invention has been described with particular reference to high altitude machines, but it is to be understood that its usefulness is not restricted to any specific application and that it is applicable to any type of dynamoelectric machine where rapid wear of the brushes may occur.

I claim as my invention:

1. In a dynamoelectric machine, a rotatable current collecting member, and a carbon brush engaging the current collecting member, said brush containing from 1% to 3% by weight of a non-hygroscopic metal halide and said current collecting member being made of an alloy of copper and nickel containing from 15% to 45% nickel.

2. In a dynamoelectric machine, a rotatable current collecting member, and a carbon brush engaging the current collecting member, said brush containing from 1% to 3% by weight of a non-hygroscopic metal halide and said current collecting member being made of an alloy containing from 30% to 45% nickel and substantially from 70% to 55% copper.

3. In a dynamoelectric machine, a rotatable current collecting member, and a carbon brush engaging the current collecting member, said brush containing from 1% to 3% by weight of barium fluoride and said current collecting member being made of an alloy of copper and nickel containing from 15% to 45% nickel.

4. In a dynamoelectric machine, a rotatable current collecting member, and a carbon brush engaging the current collecting member, said brush containing from 1% to 3% by weight of barium fluoride and said current collecting member being made of an alloy containing from 30% to 45% nickel and substantially from 70% to 55% copper.

5. In a dynamoelectric machine, a commutator comprising a plurality of commutator bars and means for clamping the bars into a cylindrical commutator assembly, said bars being made of an alloy of copper and nickel containing from 15% to 45% nickel, and carbon brushes engaging the commutator, said brushes containing from 1% to 3% by weight of a non-hygroscopic metal halide.

6. In a dynamoelectric machine, a commutator comprising a plurality of commutator bars and means for clamping the bars into a cylindrical commutator assembly, said bars being made of an alloy containing from 30% to 45% nickel and substantially from 70% to 55% copper, and carbon brushes engaging the commutator, said brushes containing from 1% to 3% by weight of barium fluoride.

7. In a dynamoelectric machine, a plurality of collector rings made of an alloy of copper and nickel containing from 15% to 45% nickel, and carbon brushes engaging the collector rings, said brushes containing from 1% to 3% by weight of a non-hygroscopic metal halide.

8. In a dynamoelectric machine, a plurality of collector rings made of an alloy containing from 30% to 45% nickel and substantially from 70% to 55% copper, and carbon brushes engaging the collector rings, said brushes containing from 1% to 3% by weight of barium fluoride.

References Cited in the file of this patent

UNITED STATES PATENTS 2,414,514    Elsey _____ Jan. 21, 1947

OTHER REFERENCES

Proceedings of the Institution of Electrical Engineering, part II, vol. 101, June 1954, Savoy Place, London, pages 217, 222, and 223.